United States Patent
Verburg et al.

(10) Patent No.: US 11,734,141 B2
(45) Date of Patent: Aug. 22, 2023

(54) DYNAMIC TESTING OF SYSTEMS

(71) Applicant: International Business Machines Corporation, Armonk, NY (US)

(72) Inventors: David Verburg, Mantorville, MN (US); Gábor Andorkó, Budapest (HU); Oscar Alejandro de la Torre Del Rio, Zapopan (MX); Richard Burton Finch, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 17/375,078

(22) Filed: Jul. 14, 2021

(65) Prior Publication Data

US 2023/0015477 A1 Jan. 19, 2023

(51) Int. Cl.
    *G06F 11/26* (2006.01)
    *G06N 20/00* (2019.01)
    *G06F 11/07* (2006.01)

(52) U.S. Cl.
    CPC ............ *G06F 11/26* (2013.01); *G06F 11/079* (2013.01); *G06N 20/00* (2019.01)

(58) Field of Classification Search
    CPC ........ G06F 11/26; G06F 11/079; G06N 20/00
    See application file for complete search history.

(56) References Cited

U.S. PATENT DOCUMENTS

| | | | |
|---|---|---|---|
| 6,338,148 B1 | 1/2002 | Gillenwater et al. | |
| 6,834,375 B1 | 12/2004 | Stine et al. | |
| 8,418,000 B1 | 4/2013 | Salame et al. | |
| 8,527,813 B2 | 9/2013 | Budnik et al. | |
| 8,855,801 B2 | 10/2014 | Bagwell et al. | |
| 9,559,915 B2 | 1/2017 | Girmonsky | |
| 9,672,142 B2 | 6/2017 | Gadzinski et al. | |

(Continued)

FOREIGN PATENT DOCUMENTS

| EP | 3379276 B1 | 3/2018 |
|---|---|---|
| JP | 2018160191 A | 10/2018 |

OTHER PUBLICATIONS

Papazoglou et al., "The manufacturing blueprint environment: Bringing intelligence into manufacturing," International Conference on Engineering, Technology and Innovation, 2017, pp. 750-759.

(Continued)

*Primary Examiner* — Matthew M Kim
*Assistant Examiner* — Matthew N Putaraksa
(74) *Attorney, Agent, or Firm* — Cantor Colburn LLP; Tihon Poltavets

(57) ABSTRACT

Aspects of the invention include receiving system data associated with a first system, the first system comprising a plurality of system components, wherein the system data comprises component data for each system component in the plurality of system components, obtaining historical performance data for each system component in the plurality of system components, determining at least one testing constraint associated with the first system, determining a test environment for the first system, the test environment comprising a plurality of test cases for the first system based on the system data, the historical performance data, and the at least one testing constraint, and executing the test environment on the first system.

18 Claims, 7 Drawing Sheets

(56) References Cited

U.S. PATENT DOCUMENTS

| | | | |
|---|---|---|---|
| 9,858,175 | B1 | 1/2018 | Raghavan et al. |
| 9,898,396 | B2 | 2/2018 | Owen et al. |
| 10,162,326 | B2 | 12/2018 | Monczynski et al. |
| 10,338,993 | B1 | 7/2019 | Lekivetz et al. |
| 10,754,764 | B2 | 8/2020 | Lekivetz et al. |
| 10,831,645 | B1 * | 11/2020 | McNeil .................. G06F 11/302 |
| 11,099,107 | B2 | 8/2021 | Dar Mousa et al. |
| 11,257,001 | B2 | 2/2022 | Liu et al. |
| 11,316,941 | B1 * | 4/2022 | Jain ..................... H04L 41/0816 |
| 11,558,414 | B1 * | 1/2023 | Nguyen .............. H04L 63/1433 |
| 2002/0072822 | A1 | 6/2002 | Raymond et al. |
| 2002/0099521 | A1 | 7/2002 | Yang et al. |
| 2003/0033234 | A1 | 2/2003 | Rudusky |
| 2006/0010426 | A1 | 1/2006 | Lewis et al. |
| 2011/0145653 | A1 | 6/2011 | Broadfoot et al. |
| 2013/0117005 | A1 | 5/2013 | Farchi et al. |
| 2014/0012560 | A1 | 1/2014 | Tzoref-Brill |
| 2014/0031966 | A1 | 1/2014 | Cheng et al. |
| 2014/0040867 | A1 * | 2/2014 | Wefers ................. G06F 11/3684 717/131 |
| 2014/0297234 | A1 | 10/2014 | Garzon et al. |
| 2015/0378873 | A1 * | 12/2015 | Prasad ................. G06F 11/3684 714/38.1 |
| 2016/0210683 | A1 | 7/2016 | Aqlan et al. |
| 2016/0314062 | A1 | 10/2016 | Pedro De Castro |
| 2017/0147722 | A1 | 5/2017 | Greenwood |
| 2017/0193143 | A1 | 7/2017 | Saha et al. |
| 2018/0011464 | A1 | 1/2018 | Monczynski et al. |
| 2018/0307582 | A1 * | 10/2018 | Vikjord .................. G06N 5/045 |
| 2019/0273510 | A1 * | 9/2019 | Elkind .................. G06F 21/562 |
| 2019/0361799 | A1 | 11/2019 | Wojciak et al. |
| 2020/0012950 | A1 | 1/2020 | Seaton et al. |
| 2020/0111015 | A1 | 4/2020 | Liu et al. |
| 2020/0183817 | A1 | 6/2020 | Scholz et al. |
| 2020/0341888 | A1 * | 10/2020 | Sridhar ............... G06F 11/3692 |
| 2021/0141688 | A1 * | 5/2021 | Borlick .................. G06N 20/00 |
| 2021/0400076 | A1 * | 12/2021 | Shivanna ............ H04L 63/1433 |
| 2022/0131900 | A1 * | 4/2022 | Karin ..................... G06F 21/572 |
| 2022/0261889 | A1 * | 8/2022 | Wittenbach ............ G06Q 40/03 |
| 2023/0033495 | A1 * | 2/2023 | Sato ....................... G06N 20/00 |

OTHER PUBLICATIONS

Pazhani et al., Rapid unconstrained fab model using a business intelligence tool: DM: Data management and data mining tools, 2016 27th Annual SEMI Advanced Semiconductor Manufacturing Conference (ASMC), 2016, pp. 220-223.

Cao et al., "A Reinforcement Learning Approach to Production Planning in the Fabrication/Fulfillment Manufacturing Process," Proceedings of the 2003 Winter Simulation Conference, 2003, pp. 1417-1423.

IBM: List of IBM Patents or Patent Applications Treated as Related (Appendix P); Date Filed: Apr. 21, 2023; 2 pages.

* cited by examiner

DYNAMIC TESTING OF SYSTEMS

BACKGROUND

The present invention generally relates to testing computer systems, and more specifically, to a dynamic testing of computer systems.

Computerized devices control almost every aspect of our life—from writing documents to controlling traffic lights. However, computerized devices can be error prone, and thus require a testing phase in which the errors, or bugs, should be discovered. The testing phase is considered one of the most difficult tasks in designing a computerized device. The cost of not discovering a bug may be enormous, as the consequences of the bug may be disastrous. Additionally, a bug in hardware or firmware may be expensive to fix if it is discovered after the computerized device has shipped to customers, as patching it may require call-back of the computerized device. Hence, many developers of computerized devices invest a substantial portion of the development cycle to discover erroneous behaviors of the computerized device.

During the testing phase a system under test (SUT) is being tested. The SUT may be, for example, a computer program, a hardware device, firmware, an embedded device, a component thereof, or the like. Testing may be performed using a test suite that includes test cases. The test suite may be reused to revalidate that the SUT exhibits a desired functionality with respect to the tests of the test suite. For example, the test suite may be reused to check that the SUT works properly after a bug is fixed. The test suite may be used to check that the bug is indeed fixed (with respect to a test that previously induced the erroneous behavior). Additionally, or alternatively, the test suite may be used to check that no new bugs were introduced (with respect to other tests of the tests suite that should not be affected by the bug fix).

SUMMARY

Embodiments of the present invention are directed to methods for dynamic testing of systems. A non-limiting example computer-implemented method includes receiving system data associated with a first system, the first system comprising a plurality of system components, wherein the system data comprises component data for each system component in the plurality of system components, obtaining historical performance data for each system component in the plurality of system components, determining at least one testing constraint associated with the first system, determining a test environment for the first system, the test environment comprising a plurality of test cases for the first system based on the system data, the historical performance data, and the at least one testing constraint, and executing the test environment on the first system.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
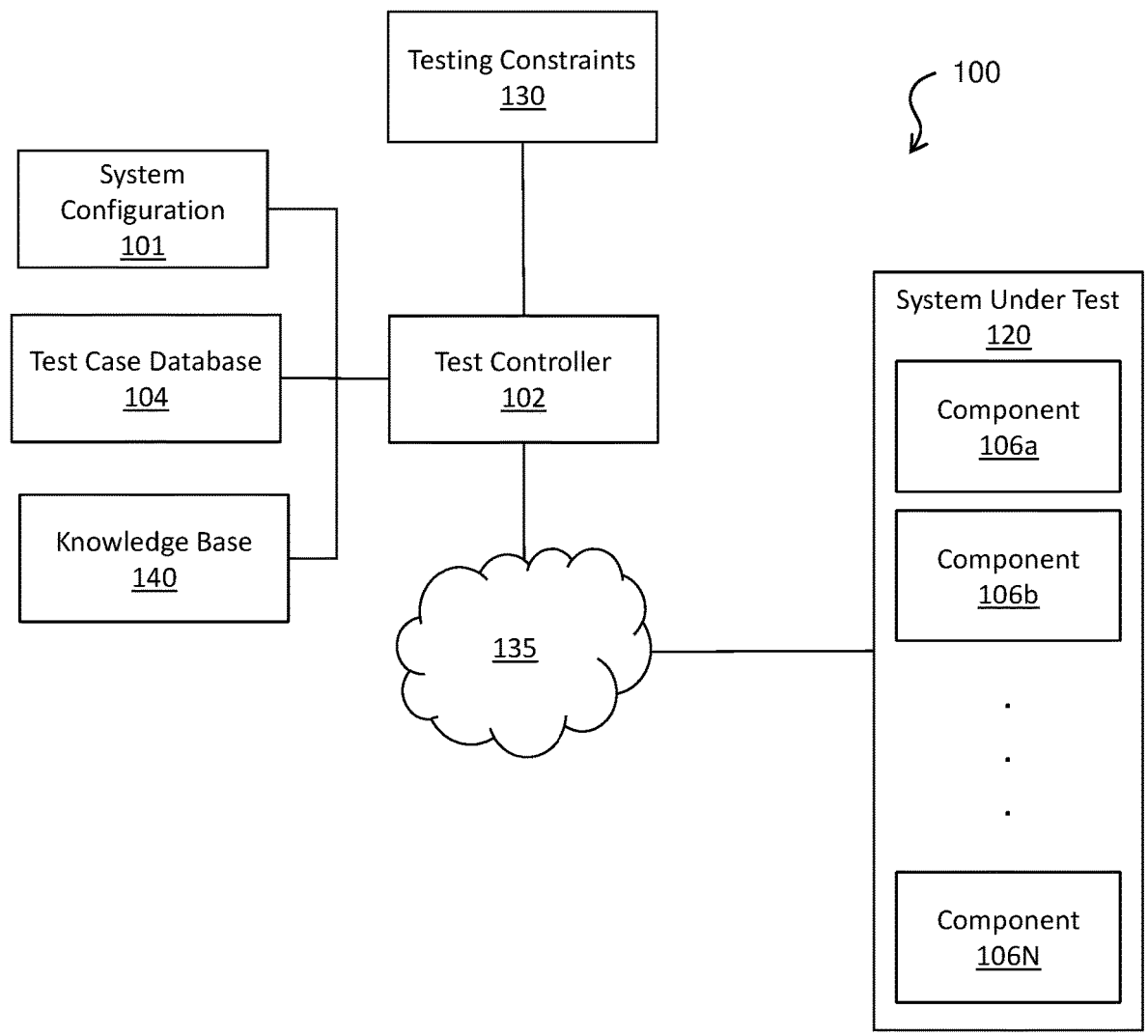
FIG. 1 depicts a block diagram of a system for dynamic testing of computer systems according to one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a dynamic testing system for computer systems and/or mainframes that utilizes information gathered from a variety of sources to determine which test cases to execute and for how long to execute said test cases. The dynamic testing system utilizes information gathered from sources such as, but not limited to: historical data, component data, and real-time data. The historical data includes, but is not limited to, the number of test failures, time to test failures, the types of failures, and/or a failure rate. This historical data is taken from past test cases executed on the same and/or similar systems, manufacturing test records of other similar systems, and/or field failure records of other similar systems. The component data includes data associated with the vintage of the component which includes year, manufacturing lot, and the like. The component data can have historical data associated with performance of the specific vintage of the component. For example, a memory card from manufacturing lot "A140" may have a particular failure mode associated with a certain number of initial program loads (IPLs) that would require testing in a specific configuration for that vintage of memory card. The real-time data includes, but is not limited to, frequency and voltage stability and temperature increase rates on systems and/or individual system components. Based on the above information, a testing algorithm executed by the dynamic testing system can make decisions about the amount of test time to employ and also, which test cases to execute. This allows the test cases used and the length of time that each test case is run to be determined dynamically as a system enters test, rather than having a defined test process that is used for a given set of systems. Two systems that have exactly the same components with similar vintages could have different tests if the second one starts test after the first one has completed, because of cognitive system learning from the first test, or new field data pulled into the system. Advantages of this dynamic testing system include the ability to identify potential cost reductions in non-recurring engineering (NRE) costs and new product introduction (NPI) life cycle costs associated with testing the systems and system components.

NRE costs refer to the one-time cost of research, design, development, and testing a new product or product enhancement. When budgeting for a new product, NRE must be considered to analyze if a new product will be profitable. Even though a company will pay for NRE on a project only once, NRE costs can be prohibitively high and the product will need to sell well enough to produce a return on the initial investment. NRE is unlike production costs, which must be paid constantly to maintain production of a product. One major NRE cost is the testing resources needed before shipping a product to a customer. When working with highly customizable products, such as mainframe computing systems, the testing phases before shipment to the customer is a costly enterprise. For example, a custom mainframe could be tailored to provide for high memory and I/O usage which would require a variety of components to meet these needs. The mainframe can be built with memory components taken from a variety of suppliers who each provide the memory having different vintages (e.g., different manufacturing lots, release years, and the like). The performance of each of these memory components can be different for each vintage. The dynamic testing system can take this memory vintage information into consideration when determining what test case to execute as well as how long to execute a test case on the specific component. Due to the wide range of configurations that a customer may need, the testing of these systems must be tailored to the specific components, test history, and real-time testing conditions in a test environment. Constraints on testing must also be factored in given that there is limited time and test resources allocated for testing before a customer order must be shipped to the customer. As such, test engineers are challenged to provide the broadest test coverage for a customer system given a test budget to help reduce the overall NRE costs.

One or more embodiments of the invention address the above problem by providing the dynamic test system that maximizes test coverage while taking into consideration the limited time budget and NRE cost budget. The dynamic test system builds a test suite of test cases for a system under test as well as determines a testing time for each test case based on the component data, historical testing data, and real-time data collected during test execution.

FIG. 1 depicts a block diagram of a system for dynamic testing of computer systems according to one or more embodiments of the invention. The system 100 includes a test controller 102 in electronic communication with a system under test 120. The test controller 102 can communicate with the system under test through a wired and/or wireless network 135. The system under test 120 includes a variety of components 106a-106N that are built to order based primarily on customer configuration requirements for the system 120. The components 106a-106N can include, but are not limited to, processor cores, memory, storage devices, battery modules, cooling systems, I/O devices, and the like. Each of these components 106a-106N are selected based on the customer need and customer pricing requirements. The configuration for this system, 101, is provided to the test controller 102 so a dynamic test decision can be made. The system 100 also includes a knowledge base 140 that includes data about each of the components 106a-106N of the system under test 120 as well as historical data related to previous test cases, failure rates, failure modes, error types, and the like. The system 100 also includes a test case database 104 that includes a variety of test cases that can be selected by the test controller 102 for execution on the system under test 120. While the system under test 120 can be any type of computer system, for ease of description, the system under test 120 described herein will be a mainframe computing system.

In one or more embodiments, a mainframe computing system is built based on a variety of customer requirements and an example of the system under test 120. In one example, a customer may request a low memory, high I/O configuration. Further, the customer has a budget for said mainframe which drives the determination of available testing time and testing resources (e.g., test engineers, etc.) that are available for testing the mainframe. Further, the customer may have a shipping date requirement that drives the date that testing must be completed which further determines what testing time and resources are available for this particular system. For example, the mainframe testing budget may be eight (8) hours of testing and must be completed before a selected date with only two (2) test engineers available. When the mainframe is built and sent for testing, the test controller 102 can obtain data associated with the components 106a-106N in the mainframe from the knowledge base 140. Based on this data, the test controller 102 can select a set of test cases from the test case database 104 and/or built one or more custom test cases for execution. Taking into consideration the time and budget constraints 130, while also calculating fail probability and time to fail projections for components 106a to 106N based on the system configuration 101 and knowledge base 140, the test controller 102 builds a test environment for execution on the system under test 120 (mainframe). The test environment includes what test cases are being executed and for how long these test cases are being executed. The test controller 102 also determines based on time and budget constraints if the learning test case 302 can be invoked, shown in FIG. 3.

In one or more embodiments of the invention, the component data taken from the knowledge base includes manufacturer data for each component 106a-106N. The manufacturer data includes historical failure rates for the individual components based on historical tests from the manufacturer and also include the vintage of the component which includes version number, manufacturing year, failure rates/modes, etc. The historical failure rates include the test type for the component and the test time, number of failures in the test steps, and the like. In addition, historical testing data taken from previous tests by the test controller 102 can be stored in the knowledge base 140. Similar to the manufacturer data, the historical testing data includes test cases executed on same and/or similar components as well as the testing times, the failure rates, failure modes, and number of failures in the test steps.

Figure 2:
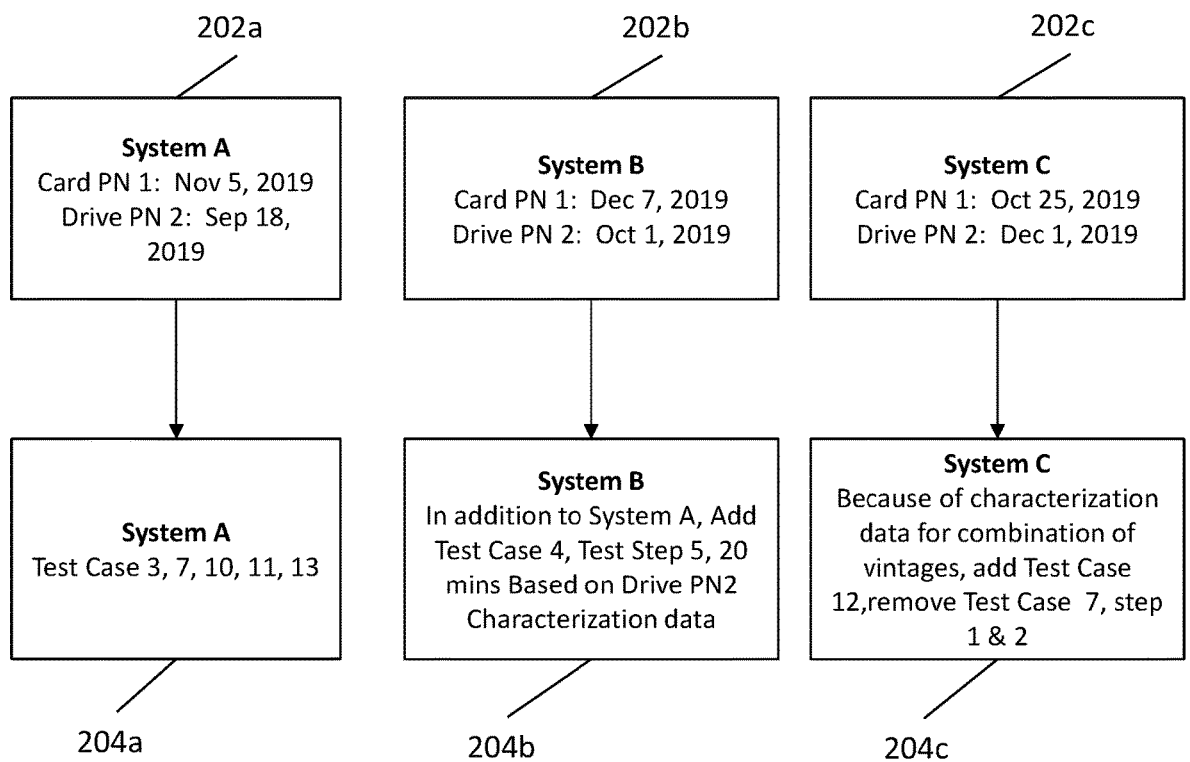
FIG. 2 depicts of block diagram of three system configurations and associated test case selection according to one or more embodiments.

FIG. 2 depicts a block diagram of three system configurations and associated test case selection according to one or more embodiments. The configurations 202a, 202b, 202c refer to System A, System B, and System C. System A 202a utilizes components Card PN 1 with a manufacturing date of Nov. 5, 2019 and Drive PN 2 with a manufacturing date of Sep. 28, 2019. The test controller 102 can obtain component data for each of these specific components to determine what test cases to run. This component data can include manufacturer vintage information for parts, failure rates, failure modes as wells as the manufacturing history for similar parts including test times, number of failures in the test steps and/or include development test results for each component. Based on this, test environment 204*a* for System A includes, for example, Test cases 3, 7, 10, 11, and 13. System B 202*b* includes components Card PN 1 with a manufacturing date of Dec. 7, 2019 and Drive PN 2 with a manufacturing date of Oct. 1, 2019. Based on these components, the test controller 102 can determine the testing environment 204 to include all the test cases from system A and add test case 4, test step 5, add 20 minutes to the testing based on the characterization data for this particular drive PN 2. System C 202*c* includes components card PN 1 manufactured on Oct. 25, 2019 and drive PN 2 manufactured on Dec. 1, 2019. The test environment 204*c* for System C can include all the test cases for System A with added test case 12, remove test case 7, and add test steps 1 and 2 based on the component characterization data. Each system 202*a*, 202*b*, 202*c* includes the same type of components but given the different vintage (manufacturing date, lot number, etc.) of each component, the test environment changes for each system.

In one or more embodiments of the invention, the example systems in FIG. 2 illustrate the test environment changes based on similar systems with different component vintages. Based on the test environments needed for the systems, the test controller 102 can also schedule testing for a variety of systems by lining up specific resources for testing a system. In the FIG. 2 examples, because the three systems are using the same test cases, these three may be scheduled for testing one after another. This can further maximize testing efficiency and reduce NRE costs based on available resources. Embodiments of the invention enable three benefits. First, it allows for better target testing so reliability goals can be met. Second, it allows for determining that testing can be reduced for a system with a given set of components and still have a confidence level that reliability requirements can be met. Third, it allows for justification for up front testing to be added to help reduce the cost of part failures for customers. For example, there is the option to build 2 similar systems with the same set of components except one component is different between the two orders. The test time would be different based on that one different component (it could be different PN and/or part of a different lot). Based on historic test/field data on systems built up with similar components the test controller 102 can determine which one of the 2 similar systems would finish tests earlier with the same confidence level for the reliability targets (or finish at the same time with higher confidence level) and the test controller 102 can determine which system would have a higher chance to fail because of that one different component. Because of this the test controller 102 can choose to build up the system that would need less time or have higher confidence level. So the test controller 102 can reduce testing time because of better component and evade a potential failure on test (because of the worse component), that could add more test time because of replacing component and possible retest of new component in the system. This not only reduces cost by saving time, but it can also allow for meeting schedules if there is limited test resources and a need to decide which system to start first.

Further, in one or more embodiments of the invention, the examples of FIG. 2 illustrate building test environments for the three systems based on components. The test controller 102 can determine the testing environment utilizing a machine learning model to identify the test cases and testing time. The machine learning model can build feature vectors including a plurality of features derived from historical test case results for various components and component vintages. The feature vectors can be plotted in a multi-variate space and when a new system configuration is presented for testing. The machine learning model can build a new feature vector for the new system and plot this new feature vector in the multi-variate space to determine a set of test cases and test times and any other test environment conditions for the new system. The test controller 102 can execute and implement one or more so-called classifiers (described in more detail below). In one or more embodiments of the invention, the features of the various classifiers described herein can be implemented on the processing system 700 shown in FIG. 7, or can be implemented on a neural network (not shown).

In one or more embodiments of the invention, the features of the classifiers can be implemented by configuring and arranging the processing system 700 to execute machine learning (ML) algorithms. In general, ML algorithms, in effect, extract features from received data (e.g., inputs to the classifiers) in order to "classify" the received data. Examples of suitable classifiers include but are not limited to neural networks (described in greater detail below), support vector machines (SVMs), logistic regression, decision trees, hidden Markov Models (HMIs), etc. The end result of the classifier's operations, i.e., the "classification," is to predict a class for the data. The ML algorithms apply machine learning techniques to the received data in order to, over time, create/train/update a unique "model." The learning or training performed by the classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the classifiers are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 100 can be implemented using the processing system 700 applies.

Figure 3:
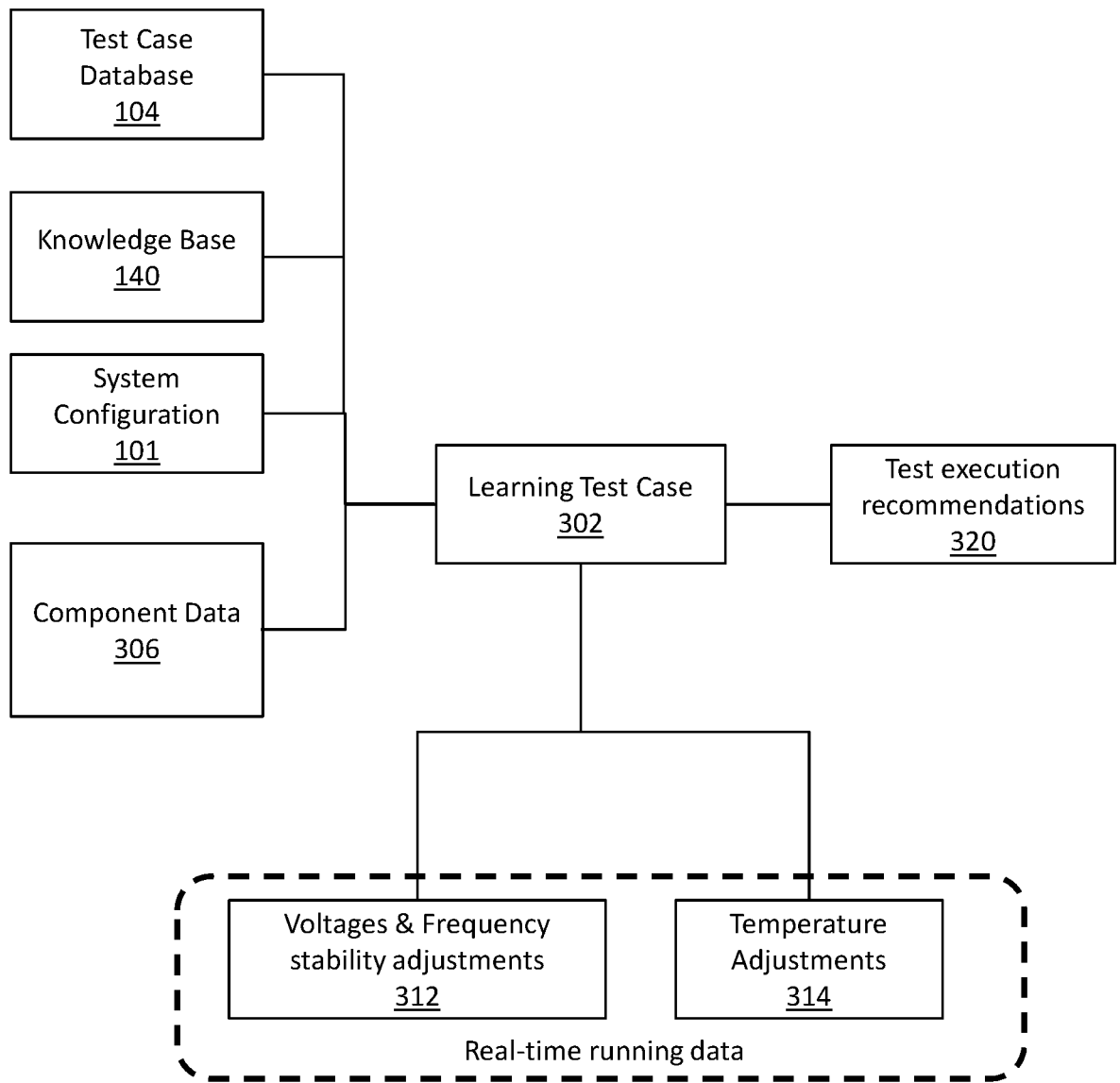
FIG. 3 depicts a block diagram of execution of the learning test case on a system under test according to one or more embodiments of the invention.

In one or more embodiments of the invention, the test controller 102 can build upon the knowledge base 140 by executing learning test cases. Should the test controller 102 determine that a testing environment requires a certain test time that is shorter than the available testing time, the test controller 102 can use the remaining test time to executing these learning test cases on the system under test 120. The learning test cases are used to explore potential errors, failures, failure modes, and the like for the components 106a-106N. The results of these learning test cases can be stored in the knowledge base 140 and be further utilized to train the machine learning model described above. The learning test cases can be built to test outlier or "corner" conditions for the system under test 120. The specific SUT where the learning test cases are being used on will not be changed, but the data is them used for future systems with similar components. The data is added to the cognitive computing feedback loop. FIG. 3 depicts a block diagram of execution of the learning test case on a system under test according to one or more embodiments of the invention. The learning test case 302 can be selected based on the system configuration 101 of the system under test and the component data 306 for the system, using information from the test case database 104 and the knowledge base 140, also referenced in FIG. 1, to select tests that may be likely to detect any potential defects in the SUT. The learning test case 302 can be executed and during testing, various parameters can be adjusted to collect real-time running data. The parameters that are adjusted include voltage and frequency adjustments 312 and system temperatures adjustments 314. This real-time data can be collected and stored for later analysis by the machine learning model. The machine learning model can use this data to later determine test execution environments and recommendations 320 for future test. The clocking frequency of the processor and memory are monitored (along with temperature and part failures) and the data is used as a part of the learning model. The learning model then may use this to adjust tests to better stress the parts and verify that they are customer-shippable. The temperature and frequency aren't adjusted directly, but can be related to certain tests; for example, a stress test could cause temperature increases.

In one or more embodiments of the invention, the test controller 102 can utilize feedback from the test cases that are run on the system under test. Based on a review of any failures that exist, the test controller 102 can select one or more additional test cases to run on the system under test if there is any available time and/or resources. In addition, the test controller 102 can obtain data from systems that are in the field with existing customers. This data can be referred to as "call home" data that is received from these existing systems that send error reports that would be used to select new test cases based on the same and/or similar components for the system under test.

In one or more embodiments of the invention, the test controller 102 can select additional test cases to run on the system under test when there exists additional time and/or resources after the initial set of test cases are run. The test controller 102 can define a threshold level for finding test cases that may exist outside a cluster of test cases. That is to say, when the test controller 102 utilizes a machine learning clustering algorithm, the threshold for selecting the test cases based on the clustering algorithm can be adjusted to select one or more new test cases that are available to run to attempt to find any field failures based on data taken regarding the system under test components.

Figure 4:
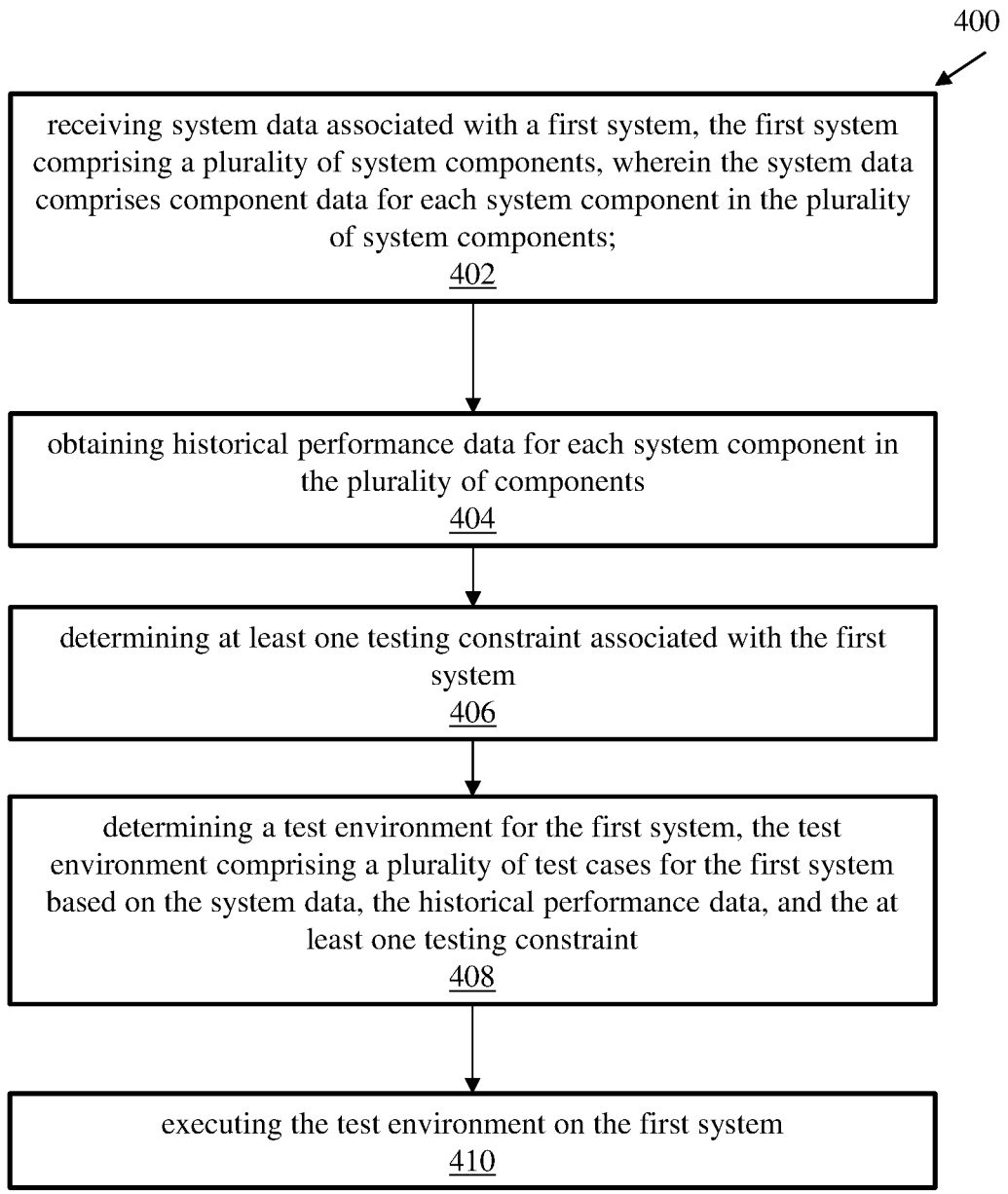
FIG. 4 depicts a flow diagram of a method for dynamic testing of systems according to one or more embodiments of the present invention.

FIG. 4 depicts a flow diagram of a method 400 for dynamic testing of systems according to one or more embodiments of the invention. At least a portion of the method 400 can be executed, for example, by the test controller 102 shown in FIG. 1. The method 400 includes receiving system data associated with a first system, the first system comprising a plurality of system components, wherein the system data comprises component data for each system component in the plurality of system components, as shown in block 402. The component data includes vintage information from the manufacturer which includes failure rates, failure modes, and the like. At block 404, the method 400 includes obtaining historical performance data for each system component in the plurality of components. The historical performance data includes historic test case results run on the same and/or similar components. Also, the method 400, at block 406, includes determining at least one testing constraint associated with the first system. The testing constraint can relate to testing time, testing resources, and/or any other NRE cost for the product. The method 400 further includes determining a test environment for the first system, the test environment comprising a plurality of test cases for the first system based on the system data, the historical performance data, and the at least one testing constraint, as shown in block 408. And at block 410, the method 400 includes executing the test environment on the first system.

Additional processes may also be included. It should be understood that the processes depicted in FIG. 4 represent illustrations, and that other processes may be added or existing processes may be removed, modified, or rearranged without departing from the scope and spirit of the present disclosure.

Figure 6:
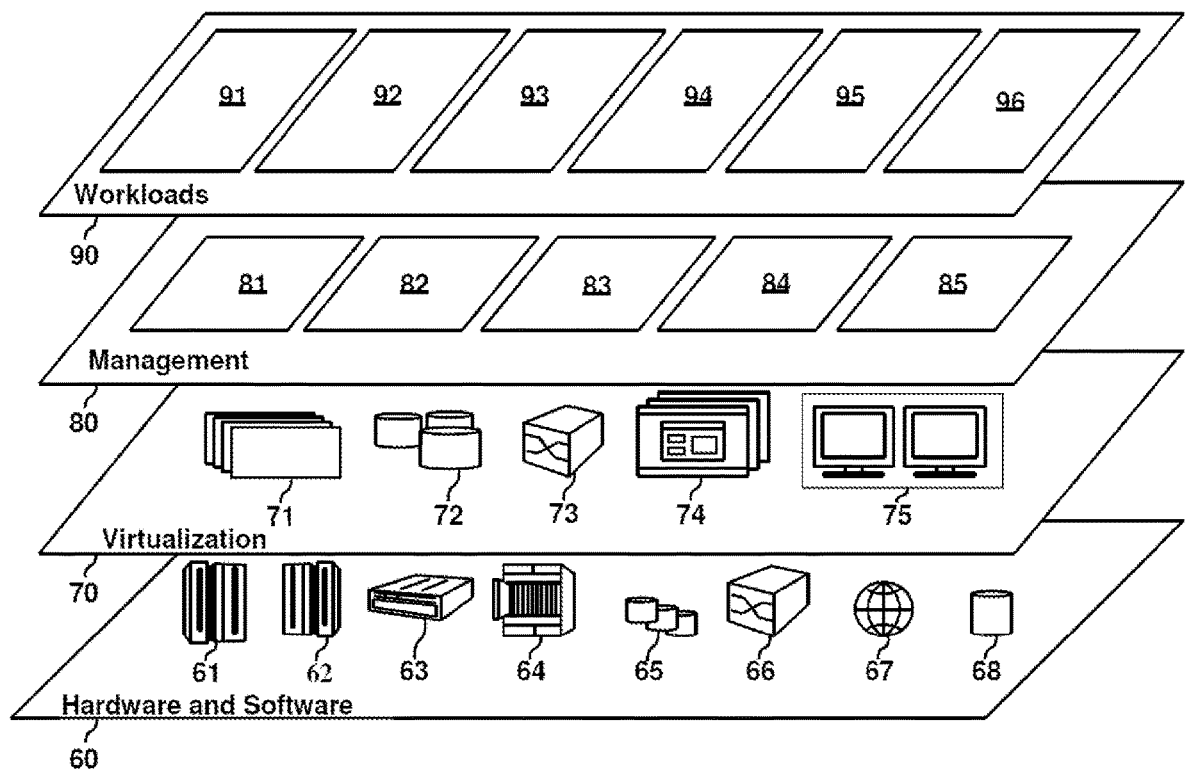
FIG. 6 depicts abstraction model layers according to one or more embodiments of the present invention.
Figure 7:
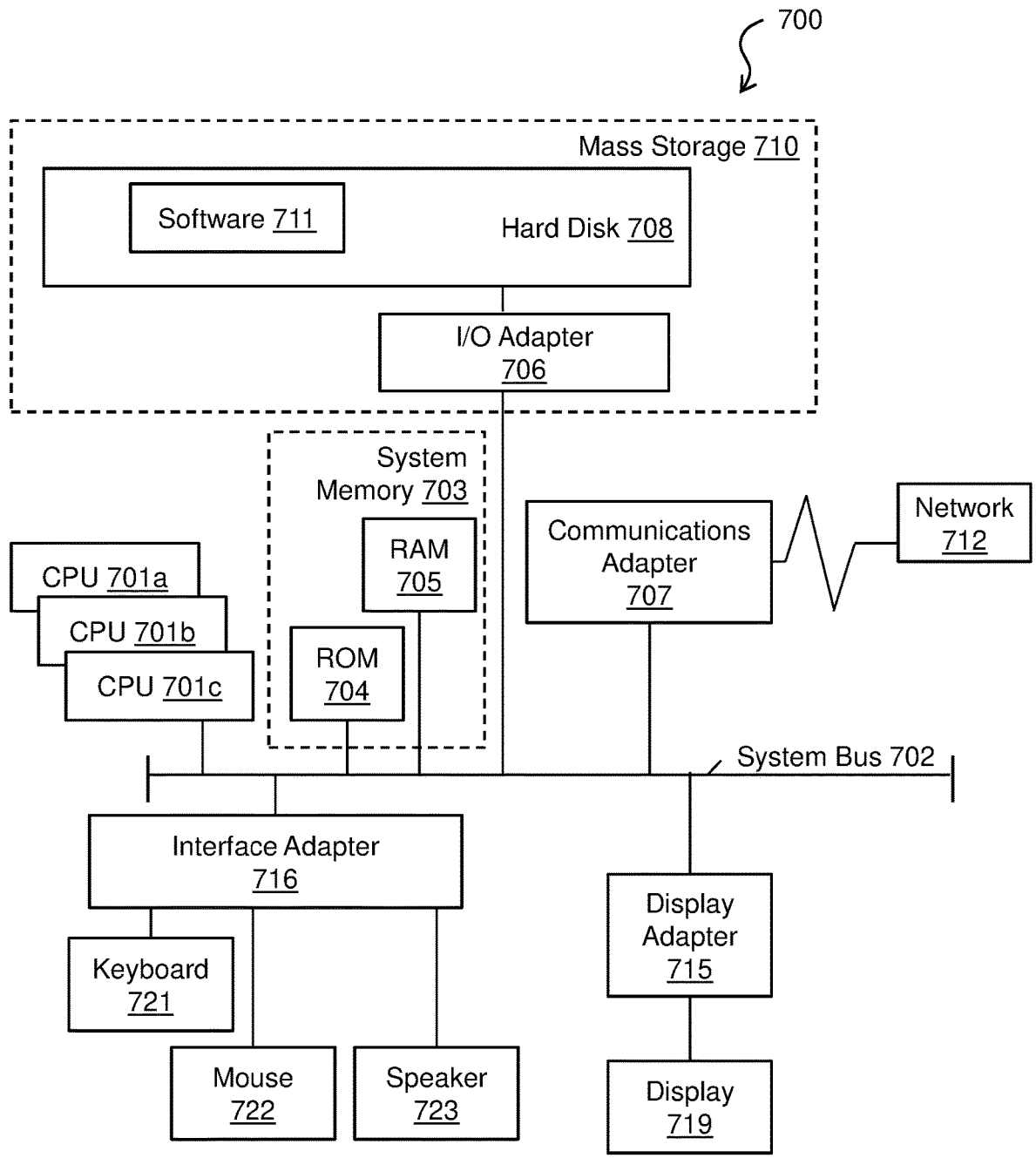
FIG. 7 depicts a computer system in accordance with one or more embodiments of the present invention.

In one or more embodiments of the invention, the controller 102 can be implemented on the processing system 700 found in FIG. 7. Additionally, the cloud computing system 50 can be in wired or wireless electronic communication with one or all of the elements of the system 100. Cloud 50 can supplement, support or replace some or all of the functionality of the elements of the system 100. Additionally, some or all of the functionality of the elements of system 100 can be implemented as a node 10 (shown in FIGS. 5 and 6) of cloud 50. Cloud computing node 10 is only one example of a suitable cloud computing node and is not intended to suggest any limitation as to the scope of use or functionality of embodiments of the invention described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
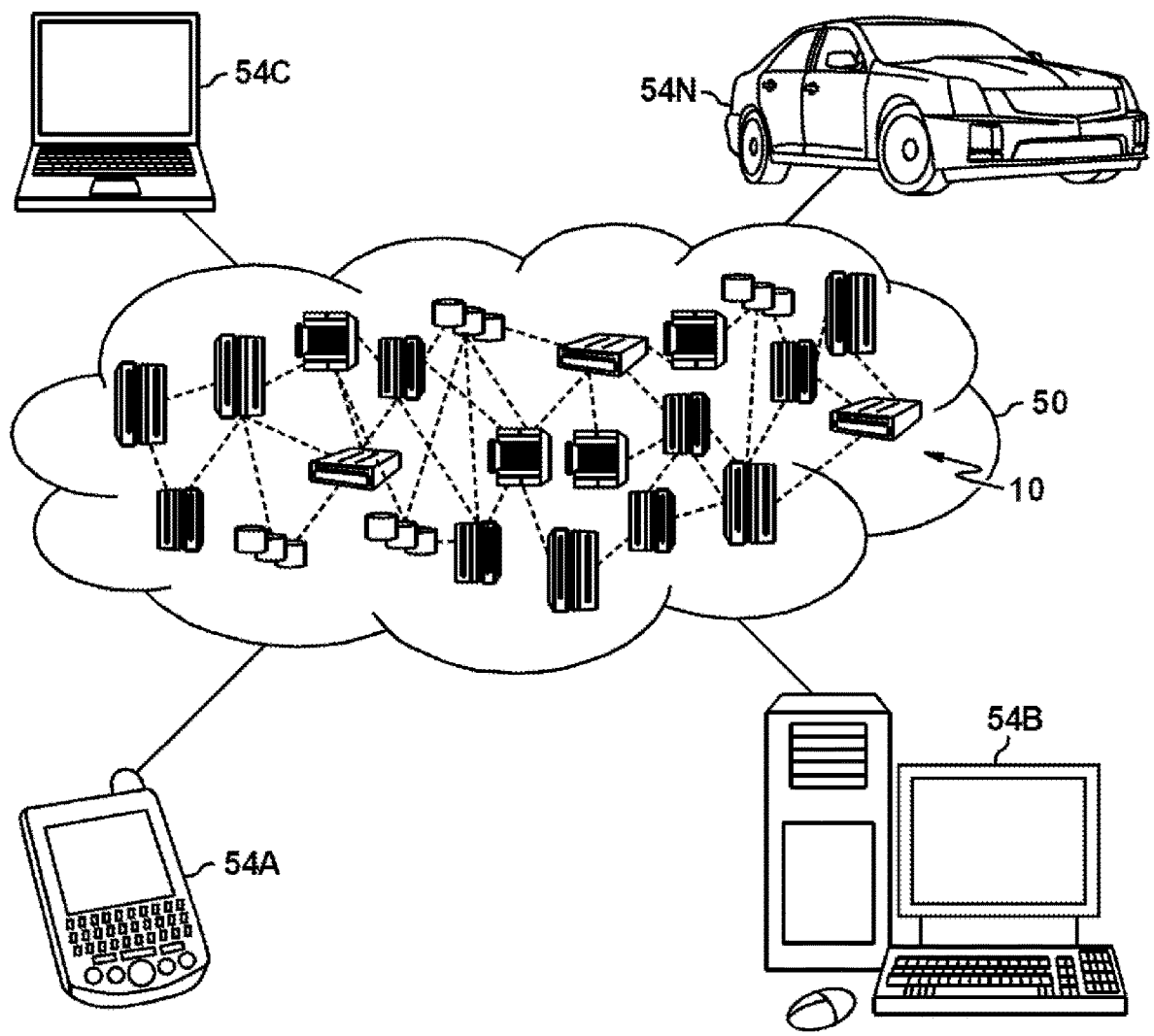
FIG. 5 depicts a cloud computing environment according to one or more embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a semi-virtualized, portable command center 96.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving system data associated with a first system, the first system comprising a plurality of system components, wherein the system data comprises component data for each system component in the plurality of system components;
   obtaining historical performance data for each system component in the plurality of system components;
   determining at least one testing constraint associated with the first system;
   determining a test environment for the first system, the test environment comprising a plurality of test cases for the first system based on the system data, the historical performance data, and the at least one testing constraint; and
   executing the test environment on the first system,
   wherein determining the test environment for the first system comprises:
   generating, via a machine learning model, a first feature vector comprising a plurality of features extracted from the component data;
   plotting the first feature vector in a multi-variate feature space; and determining the test environment based on a location of the first feature vector in the multi-variate feature space.

2. The computer-implemented method of claim 1, further comprising:
   determining a test time for test environment for the first system based at least in part on the system data, the historical performance data, and the at least one testing constraint.

3. The computer-implemented method of claim 1, wherein the at least one testing constraint comprises a total testing time limit constraint, and the method further comprises:
   determining an available time period based on the total testing time limit and the testing time for the testing environment; and
   collecting learning data on the first system during the available time period.

4. The computer-implemented method of claim 3, wherein collecting the learning data on the first system comprises:
   executing a learning test case on the first system during the available time period; and
   adjusting one or more system parameters of the first system during the learning test case execution.

5. The computer-implemented method of claim 4, wherein the one or more system parameters comprise at least one of a voltage adjustment, a frequency adjustment, and a temperature adjustment.

6. The computer-implemented method of claim 1, wherein the plurality of system components comprise one or more of a memory card, a cooling system, and a processor core.

7. The computer-implemented method of claim 1, wherein determining the at least one testing constraint comprises:
   determining a first system test budget;
   calculating a testing time limit based on the first system test budget; and
   determining the at least one testing constraint as the testing time limit.

8. A system comprising:
   a memory having computer readable instructions; and
   one or more processors for executing the computer readable instructions, the computer readable instructions controlling the one or more processors to perform operations comprising:
      receiving system data associated with a first system, the first system comprising a plurality of system components, wherein the system data comprises component data for each system component in the plurality of system components;
      obtaining historical performance data for each system component in the plurality of system components;
      determining at least one testing constraint associated with the first system;
      determining a test environment for the first system, the test environment comprising a plurality of test cases for the first system based on the system data, the historical performance data, and the at least one testing constraint; and
      executing the test suite on the first system,
   wherein determining the test environment for the first system comprises:
   generating, via a machine learning model, a first feature vector comprising a plurality of features extracted from the component data;
   plotting the first feature vector in a multi-variate feature space; and
   determining the test environment based on a location of the first feature vector in the multi-variate feature space.

9. The system of claim 8, wherein the operations further comprise:
   determining a test time for test environment for the first system based at least in part on the system data, the historical performance data, and the at least one testing constraint.

10. The system of claim 8, wherein the at least one testing constraint comprises a total testing time limit constraint, and the operations further comprise:
    determining an available time period based on the total testing time limit and the testing time for the testing environment; and
    collecting learning data on the first system during the available time period.

11. The system of claim 10, wherein collecting the learning data on the first system comprises:
    executing a learning test case on the first system during the available time period; and
    adjusting one or more system parameters of the first system during the learning test case execution.

12. The system of claim 11, wherein the one or more system parameters comprise at least one of a voltage adjustment, a frequency adjustment, and a temperature adjustment.

13. The system of claim 8, wherein the plurality of system components comprise one or more of a memory card, a cooling system, and a processor core.

14. The system of claim 8, wherein determining the at least one testing constraint comprises:
    determining a first system test budget;
    calculating a testing time limit based on the first system test budget; and
    determining the at least one testing constraint as the testing time limit.

15. A computer program product comprising a computer readable storage medium having program instructions embodied therewith, the program instructions executable by one or more processors to cause the one or more processors to perform operations comprising:
    receiving system data associated with a first system, the first system comprising a plurality of system components, wherein the system data comprises component data for each system component in the plurality of system components;
    obtaining historical performance data for each system component in the plurality of system components;
    determining at least one testing constraint associated with the first system;
    determining a test environment for the first system, the test environment comprising a plurality of test cases for the first system based on the system data, the historical performance data, and the at least one testing constraint; and
    executing the test suite on the first system, wherein determining the test environment for the first system comprises:
    generating, via a machine learning model, a first feature vector comprising a plurality of features extracted from the component data;
    plotting the first feature vector in a multi-variate feature space; and determining the test environment based on a location of the first feature vector in the multi-variate feature space.

16. The computer program product of claim 15, wherein the operations further comprise:
determining a test time for test environment for the first system based at least in part on the system data, the historical performance data, and the at least one testing constraint.

17. The computer program product of claim 15, wherein the at least one testing constraint comprises a total testing time limit constraint; and the operations further comprise:
determining an available time period based on the total testing time limit and the testing time for the testing environment; and
collecting learning data on the first system during the available time period.

18. The computer program product of claim 17, wherein collecting the learning data on the first system comprises:
executing a learning test case on the first system during the available time period; and
adjusting one or more system parameters of the first system during the learning test case execution.

* * * * *